United States Patent Office 3,040,080
Patented June 19, 1962

3,040,080
ORGANOSILOXY METHYL ALKANES
Horst Köpnick, Koln-Stammheim, Detlef Delfs, Opladen, and Walter Simmler, Koln-Mulheim, Germany, assignors to Farbenfabriken Bayer Aktiengesellschaft, Leverkusen, Germany, a corporation of Germany
No Drawing. Filed Dec. 12, 1960, Ser. No. 75,113
Claims priority, application Germany Dec. 19, 1959
6 Claims. (Cl. 260—448.8)

The invention relates to a process for the production of new organosiloxy methyl alkanes of the formula $$[R(O-CH_2-CR'H)_xO(Si(CH_3)_2-O)_yCH_2-]_nCR''_{4-n}$$

wherein R denotes a monovalent lower hydrocarbon radical, R' and R'' mean hydrogen atoms or monovalent lower hydrocarbon radicals, $x$ denotes a whole number greater than 3, $y$ a whole number greater than 2 and $n$ one of the numbers 3 or 4. If $n$ denotes the number 4, the formula designates a tetrakis-(organosiloxy-methyl)-methane, i.e. an ester of pentaerythritol, in the other cases it designates a tris-(organosiloxy-methyl)-alkane.

According to the invention these compounds are produced by trans-esterifying an α,ω-dialkoxy-polydimethyl-siloxane at one end of the siloxane chain with a tris-(hydroxymethyl)-alkane or with pentaerythrite and at the other end with a polyalkylene-glycol monoalkyl ether with the admixture of a catalyst at temperatures between 50 and 300° C. The last mentioned ethers may contain different radicals R' in one polyalkylene oxide chain, i.e. they may be co-polymerized in a manner known as such from several alkylene oxides, for example by combination of ethylene oxide and propylene oxide, butylene oxide, styrene oxide.

The process may be carried out in one step but also, with advantage, in two steps. In the first case, a polyalkylene-glycol monoalkyl ether is mixed with an α,ω-dialkoxy-polydimethyl-siloxane and a tris-(hydroxymethyl)-alkane (or pentaerythritol), the quantities being determined according to the reaction scheme:

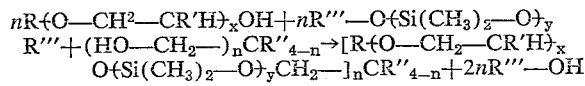

wherein R''' denotes a lower alkyl radical (R, R', R'', $n$, $x$, $y$ having the above definition), to this mixture are added at least 0.05 percent by weight of a fluorofatty acid and an amount of toluene or xylene approximately equal to the weight of the mixture as inert solvent, and the material is boiled under reflux of this solvent and with the simultaneous distillation of the R'''OH thereby formed, until the amount of this alcohol calculated from the reaction equation is evaporated down. The residue is neutralized with sodium hydrogen carbonate or magnesium oxide, filtered and the solvent is distilled off from the filtrate under vacuum. An organosiloxy methyl alkane of the formula given in the introduction remains as a colourless oil.

The process is carried out in two steps by first mixing and heating the polysiloxane with the hydroxyalkane and a catalyst, preferably a fluoro-, especially a perfluoro-fatty acid, in a quantity of at least 0.05 percent by weight of the reaction mixture, in a proportion such that according to the reaction equation

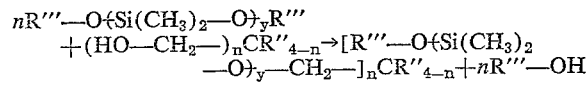

(R'', R''', $n$, $y$ having the above definition) about half of the alkoxy groups remains at the polysiloxane, whilst the remaining alkoxy groups evaporate down as alcohol R'''OH. Besides the said components there may be added to the reaction mixture toluene or xylene, in order to accelerate homogenizing and to obviate over-heating, and the heating may be carried out under reflux. The residual siloxymethyl alkane of this first step may be isolated, if desired, after neutralization of the catalyst and filtration of the salt thereby formed, as a thinly liquid oil; it is further transesterified in the second step by heating it to the boil under reflux with a polyalkylene-glycol monoalkyl ether in the presence of an acid catalyst and an inert solvent, both of which may be the same as in the first trans-esterification step, according to the reaction scheme:

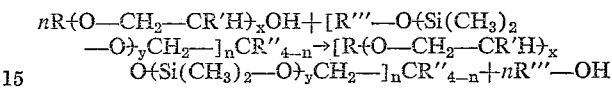

(R, R', R'', R''', $n$, $x$, $y$ having the above definition). The quantity of solvent is chosen equal to the total weight of the reaction components. Refluxing is adjusted so that the alcohol R'''OH is driven off and heating is terminated when the amount of alcohol calculated from the reaction equation is evaporated down. The process is continued as described for the one-step method.

By both methods of carrying out the process homogeneously liquid uniform crude products are obtained; in particular, there does not occur the generally expected formation of siloxane compounds esterified at both ends of the chain with the same alcohol radicals which may proceed with transesterification of primary reaction products in addition to other side reactions.

The new siloxane compounds obtained according to the process of the invention have the property of being hydrophilic as well as soluble to some extent in fats and hydrocarbon oils. This renders them especially suitable for use in cosmetic preparations. In ointments and cremes for the protection or care of the human skin organopolysiloxanes are known to increase the gliding property and thus to facilitate the applications of thin layers and the rubbing in of the preparations. In the case of water-containing dispersions, it is advantageous that the siloxane compound added in the quantity commonly used for these purposes, i.e. of about 1 to 3 percent by weight, is soluble in the oily ingredient of the preparation so that, after evaporation or resorption of the water, a homogeneous film remains on the skin; moreover, the siloxane compound should impart to the oil or fat the hydrophilic property required for the formation of a good emulsion that is to say it should have a certain emulsifying effect. The task to combine these two properties in one organosiloxane compound is solved by the products according to the invention.

The following examples are given for the purpose of illustrating the invention.

*Example 1*

2.5 litres of toluene,
1670 g. of the anhydrous monomethyl ether of a polyproplyene glycol having OH number 41.8,
54 g. of 1,1,1-tris-(hydroxymethyl)-propane,
1000 g. of α,ω-diethoxy-polydimethyl-siloxane of mean molecular weight 830, approximately corresponding to decasiloxane, and
2 g. of monofluoroacetic acid are mixed together.

The mixture is boiled under reflux for approximately 5 hours. During this time, the calculated amount of alcohol (107 g.) with some toluene distills off from the mixture which becomes homogeneous. The mixture is then neutralized with sodium hydrogen carbonate, filtered and freed from toluene by distillation under reduced pressure. 2100 g. of tris-(methoxy-polypropoxy-polydimethyl-siloxymethyl)-propane remain as a colourless oil of viscosity 850 cp. (20° C.) which no longer contains hydroxyl compounds and is soluble in paraffin oil to 0.9 percent by volume, in crude mineral oil to 2.6 percent by volume and whose solubility in linseed oil, turpentine oil and castor oil is unlimited.

*Example 2*

1.7 litres of toluene,
79 g. of 1,1,1-tris-(hydroxymethyl)-ethane,
2000 g. of α,ω-diethoxy-polydimethylsiloxane of mean molecular weight 510 containing 17.8 percent by weight of ethoxy radicals and approximately corresponding to hexasiloxane, and
8 g. of trifluoracetic acid are mixed together.

The mixture is boiled under reflux, until the calculated amount of ethyl alcohol (89 g.) has distilled off.

Subsequently, the homogeneous residue is added to a solution, heated to 110° C., of 2520 g. of the anhydrous monoethyl ether of a polyalkylene glycol whose alkylene oxide units consist of ethylene oxide and propylene oxide in the proportion by weight of 2:1 and whose OH number is 43, in 1.5 litres of toluene and the mixture thus obtained is heated to the boil under reflux of the toluene, until it has become homogeneous and the ethyl alcohol is completely distilled off which is the case after several hours.

The residue is treated with the quantity of sodium hydrogen carbonate required for neutralization, boiled for ½ hour, filtered and the solvent is driven off from the filtrate by evaporation under vacuum.

4300 g. of a colourless oil remains which essentially consists of tris-(ethoxy-polyalkoxy-polyldimethyl-siloxymethyl)-ethane and has a viscosity of 480 cp. (25° C.) and OH number 2.

*Example 3*

8 litres of toluene,
725 g. of 1,1,1-tris-(hydroxymethyl)-propane,
12,870 g. of α,ω-diethoxy-polydimethyl-siloxane of mean molecular weight 775 containing 11.35 percent by weight of ethoxy radicals and approximately corresponding to decasiloxane, and
70 g. of trifluoracetic acid are mixed together.

The mixture is boiled under reflux, until three quarters (540 g.) of the calculated amount of ethyl alcohol is distilled off. The homogeneous residue is subsequently added to a hot solution of 23,000 g. of the anhydrous monobutyl ether of a polyalkylene glycol whose alkylene oxide units consist of equal parts by weight of ethylene oxide and propylene oxide and whose mean molecular weight is 3400, in 10 litres of toluene, and the ethyl alcohol deriving from the residual ethoxy groups is completely distilled off with the use of a fractionating column.

In the residue, the acid catalyst is neutralized by adding 250 g. of sodium hydrogen carbonate and boiling for ½ hour, the material is filtered and the solvent driven off from the filtrate by evaporation under vacuum. 3300 g. of tris - (butoxy - polyalkoxy - polydimethyl - siloxymethyl)-pro-pane remain as a colourless oil having a viscosity of 1150 cp. (20° C.) which no longer contains hydroxyl groups and is miscible with water in any proportion.

We claim:
1. Process for the production of organosiloxy methyl alkanes of the formula

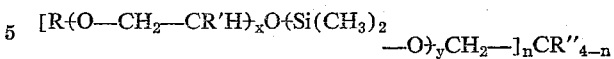

wherein R denotes a monovalent lower alkyl radical, R' and R" mean a member selected from the group consisting of hydrogen atoms and monovalent lower alkyl radicals, $x$ is a whole number greater than 3, $y$ is a whole number greater than 2 and $n$ is one of the numbers 3, and 4, characterized by heating a hydroxymethyl alkane of the general formula

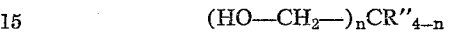

wherein R" and $n$ have the above mentioned significance, a dialkoxy-polydimethyl-siloxane of the general formula

wherein R''' denotes a lower alkyl radical and $y$ has the above mentioned significance, and a polyalkylene glycol monoalkyl ether of the general formula

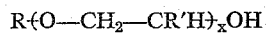

wherein R, R' and $x$ have the above mentioned significance, in the presence of an acid catalyst in a quantity of at least 0.05 percent of the total weight of the said reaction components, while driving off the alcohol R'''OH formed during the reaction, to temperatures between 50 and 300° C. and, after neutralization of the catalyst, recovering the organo siloxymethyl alkane thereby formed.

2. Process according to claim 1, characterized by reacting in a first step hydroxymethyl alkane with dialkoxypolydimethylsiloxane in the presence of the catalyst by heating to temperatures between 50 and 300° C., and further reacting the resulting reaction mixture in a second step with polyalkylene glycol monoalkyl ether while distilling off the alcohol R'''OH obtained from the reaction, after an inert solvent has been prior to one of the two steps, in a quantity equal to the total weight of the reaction components.

3. Organosiloxy methyl alkanes of the formula

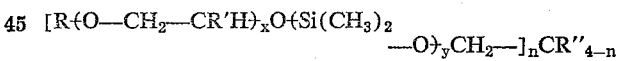

wherein R denotes a monovalent lower alkyl radical, R' and R" mean a member selected from the group consisting of hydrogen atoms and monovalent lower alkyl radicals, $x$ is a whole number greater than 3, $y$ is a whole number greater than 2 and $n$ is one of the numbers 3 and 4.

4. Tris - (methoxy - polypropoxy - polydimethyl - siloxymethyl)-propane.

5. Tris - (ethoxy - polyalkoxy - polydimethyl - siloxymethyl)-ethane.

6. Tris - (butoxy - polyalkoxy - polydimethyl - siloxymethyl)-propane.

References Cited in the file of this patent

UNITED STATES PATENTS 2,917,480    Bailey et al. _____ Dec. 15, 1959